United States Patent

Platter et al.

[11] Patent Number: 5,534,145
[45] Date of Patent: * Jul. 9, 1996

[54] COMPACT WATER FILTRATION PUMP

[75] Inventors: Sanford Platter; Jeffrey K. Aldred; Richard J. Kraemer, all of Boulder, Colo.

[73] Assignee: SweetWater, Inc., Boulder, Colo.

[*] Notice: The portion of the term of this patent subsequent to Nov. 22, 2011, has been disclaimed.

[21] Appl. No.: 290,688

[22] Filed: Aug. 15, 1994

Related U.S. Application Data

[63] Continuation-in-part of Ser. No. 285,351, Aug. 3, 1994, Pat. No. 5,431,816, and a continuation-in-part of Ser. No. 990,526, Dec. 15, 1992, Pat. No. 5,366,642, and a continuation-in-part of Ser. No. 682,650, Apr. 9, 1991, Pat. No. 5,433,848.

[51] Int. Cl.⁶ .................................................. B01D 35/26
[52] U.S. Cl. .................... 210/90; 210/130; 210/238; 210/266; 210/282; 210/286; 210/338; 210/416.3; 210/470; 210/541; 210/542
[58] Field of Search ............................ 210/767, 416.3, 210/416.1, 416.2, 416.4, 416.5, 232, 237, 238, 282, 541, 542, 266, 440–443, 448, 449, 452, 459, 460, 462, 463, 469, 473, 474, 90, 130; 417/544, 238, 319, 234; 285/13, 14

[56] References Cited

U.S. PATENT DOCUMENTS

| | | | |
|---|---|---|---|
| 2,892 | 12/1842 | Bishop | 210/416.3 |
| 341,923 | 5/1886 | Laing et al. | 210/417 |
| 415,927 | 11/1889 | Stiles | 210/416.3 |
| 472,547 | 4/1892 | Nordtmeyer | 210/416.3 |
| 1,906,391 | 5/1933 | McKinley | |
| 2,338,418 | 1/1944 | Forrest et al. | 210/167 |
| 2,436,077 | 2/1948 | Robertson | 210/94 |
| 2,473,986 | 6/1949 | Booth | 210/185 |
| 2,526,656 | 10/1950 | Goetz | 210/152 |
| 2,566,371 | 9/1951 | Quinn | 210/113 |
| 2,670,081 | 2/1954 | Quinn | 210/120 |
| 3,289,847 | 12/1966 | Rothemund | 210/266 |
| 3,327,859 | 6/1967 | Pall | 210/266 |
| 3,469,696 | 9/1969 | Petrucci et al. | 210/97 |
| 3,715,035 | 2/1973 | Teeple, Jr. et al. | 210/249 |
| 3,730,651 | 5/1973 | Ellis | 417/554 |
| 3,950,253 | 4/1976 | Stern | 210/282 |
| 3,966,364 | 6/1976 | Bachle et al. | 417/539 |
| 3,995,966 | 12/1976 | Blancha | 417/254 |
| 4,013,562 | 3/1977 | Gott | 210/232 |
| 4,151,092 | 4/1979 | Grimm et al. | 210/256 |
| 4,187,173 | 2/1980 | Keefer | 210/23 H |
| 4,196,081 | 4/1980 | Pavia | 210/94 |
| 4,277,333 | 7/1981 | Coppola | 210/136 |
| 4,298,475 | 11/1981 | Gartner | 210/266 |
| 4,389,311 | 6/1983 | La Freniere | 210/198.1 |
| 4,430,213 | 2/1984 | Ishikawa | 210/136 |

(List continued on next page.)

FOREIGN PATENT DOCUMENTS 660024 11/1949 United Kingdom.

*Primary Examiner*—Cynthia L. Nessler
*Attorney, Agent, or Firm*—Duft, Graziano & Forest

[57] ABSTRACT

A portable, manually-operated water filtration pump for purifying water. The pump includes an inexpensive, disposable filter cartridge which can be easily changed when the filter elements are no longer effective. The pump uses a lever to actuate a double-acting piston. The lever is collapsible to one side of the pump for compact storage. The filter cartridge is a tubular cylinder having an inner bore forming the pump cylinder. A cylindrical mechanical filter is concentric with and adjacent to the inner bore to filter out particulates larger than 0.3 microns. A fluidized granual activated carbon filter surrounds the mechanical filter to absorb halogen and halogen-related compounds such as herbicides and pesticides. The pump pumps filtered water into a bottle adaptor which will fit most standard water containers. A prefilter is provided to screen out large particulates from the pump to enhance the life of the filter elements. The prefilter is shaped such that it will sink in water sources and to keep the prefilter inlet substantially upright in still water and tilted from horizontal in moving water.

16 Claims, 11 Drawing Sheets

U.S. PATENT DOCUMENTS

| | | | |
|---|---|---|---|
| 4,443,336 | 4/1984 | Bennethum | 210/238 |
| 4,447,347 | 10/1984 | Sylva | 210/232 |
| 4,485,015 | 11/1984 | Smith | 210/455 |
| 4,495,068 | 1/1985 | Rosaen | 210/91 |
| 4,500,425 | 2/1985 | Thornton et al. | 210/136 |
| 4,515,378 | 5/1985 | Marshall | 277/152 |
| 4,540,489 | 9/1985 | Barnard | 210/287 |
| 4,605,499 | 8/1986 | Wise | 210/282 |
| 4,622,136 | 11/1986 | Karcey | 210/168 |
| 4,632,757 | 12/1986 | Rosenberg | 210/411 |
| 4,894,154 | 1/1990 | Roz et al. | 210/266 |
| 4,913,808 | 4/1990 | Haque | 210/93 |
| 5,004,536 | 4/1991 | Geisler | 210/136 |
| 5,019,252 | 5/1991 | Kamei et al. | 210/136 |
| 5,066,391 | 11/1991 | Faria | 210/85 |
| 5,092,990 | 3/1992 | Muramatsu et al. | 210/136 |
| 5,106,500 | 4/1992 | Hembree et al. | 210/266 |
| 5,116,502 | 5/1992 | Ferguson | 210/266 |
| 5,120,437 | 6/1992 | Williams | 210/244 |
| 5,126,041 | 6/1992 | Weber et al. | 210/136 |
| 5,266,196 | 11/1993 | Fife et al. | 210/416.3 |
| 5,268,093 | 12/1993 | Hembree et al. | 210/136 |
| 5,366,642 | 11/1994 | Platter et al. | 210/767 |
| 5,431,816 | 7/1995 | Aldred et al. | 210/460 |
| 5,433,848 | 7/1995 | Platter et al. | 210/238 |

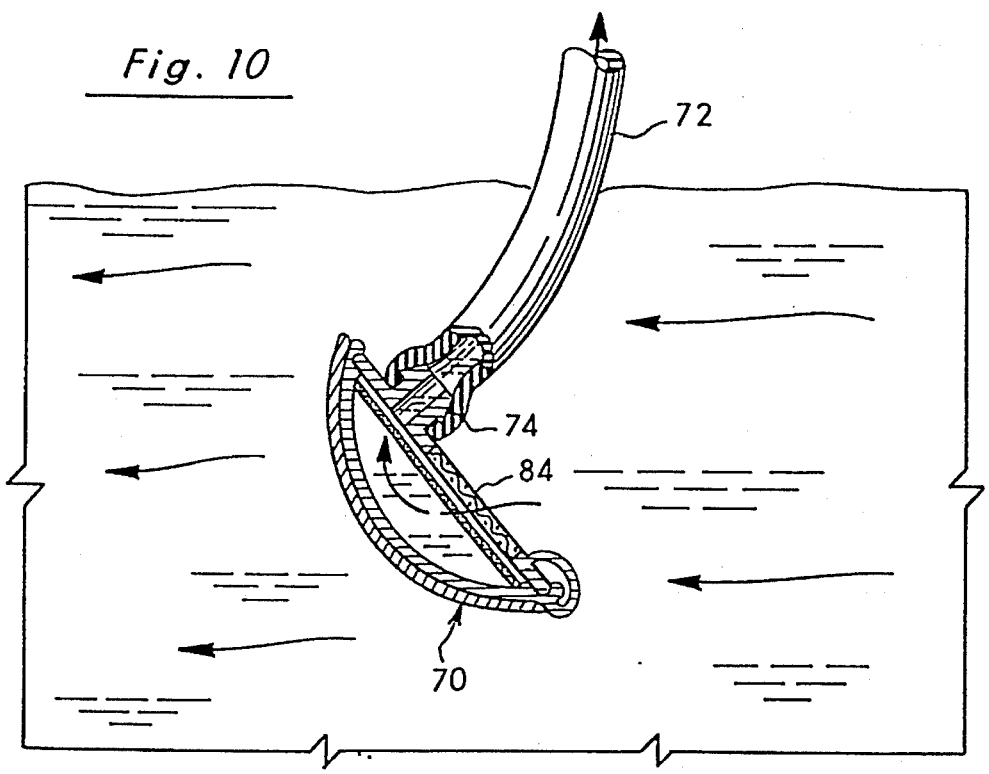
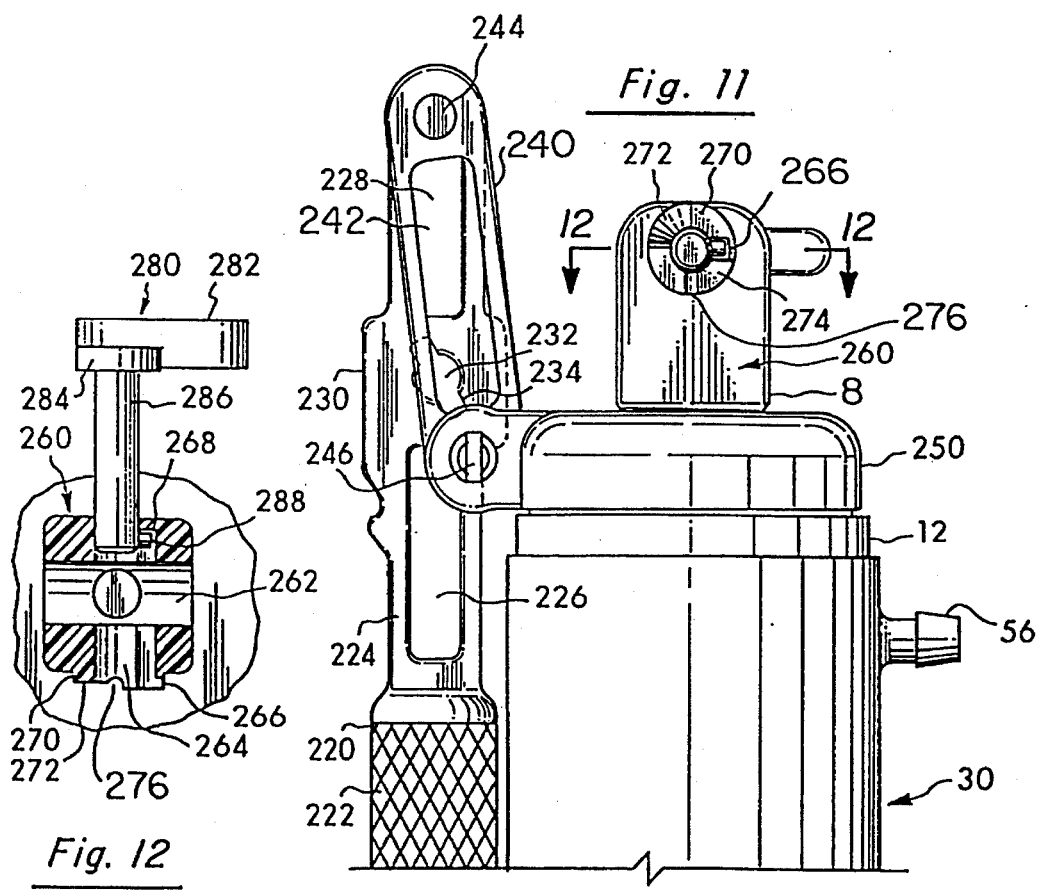

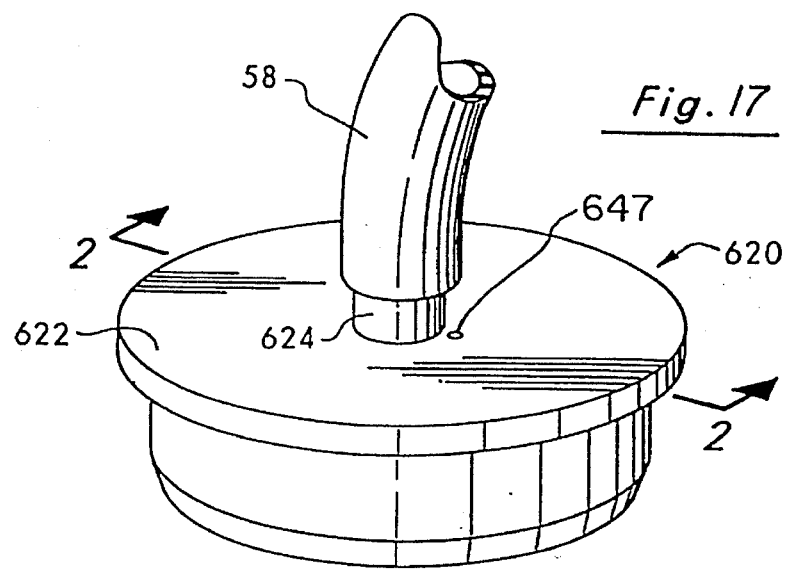
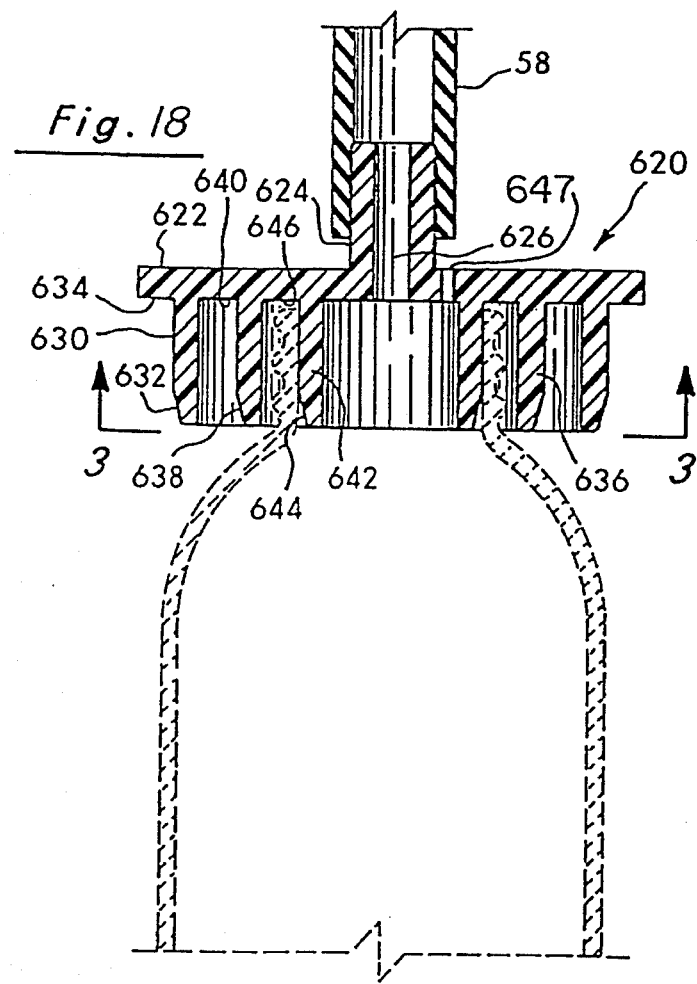

COMPACT WATER FILTRATION PUMP

RELATED APPLICATIONS

This application is a continuation-in-part of application Ser. No. 08/285,351 filed Aug. 3, 1994, now U.S. Pat. No. 5,431,816, and application Ser. No. 07/990,526, filed 15 Dec. 1992, now U.S. Pat. No. 5,366,642 issued 22 Nov. 1994, and application Ser. No. 07/682,650, filed 9 Apr. 1991, now U.S. Pat. No. 5,433,848. The disclosure of each of these applications is hereby incorporated by reference into the present application to the same extent as if fully set forth herein.

FIELD OF THE INVENTION

This invention relates to the field of water filtration units, and particularly to portable water filtration pumps for backcountry or travel use, as well as other applications where manual water filtration is required.

STATEMENT OF THE PROBLEM

Water filtration is a problem in today's world. There presently are a large number of systems available for home and industrial water purification. However, these units are relatively large and designed to be affixed to a pressurized water source. A need exists for a portable system of water filtration, particularly for a lightweight, compact water filtration unit. Such a unit is necessary for filtering water for travelers, campers, backpackers, fishermen, hunters, rafters, as well as for emergency situations, and the like.

Water sources, even those that appear to be clear, are often contaminated. Water contaminants include particulate matter, chemicals, insects, nematodes, fungi, algae, yeasts, microorganisms, discoloration and radioactive contamination. The microorganisms often found in water sources include pathogenic microbes such as protozoa (which includes Giardia Lamblia), bacteria, and viruses. Chemicals often found in water sources include halogens and other halogen related compounds such as herbicides and pesticides.

The currently available portable systems for water treatment are of three types: boiling, chemical treatment, and mechanical filtration. Boiling water is time consuming and requires the need for fire. Also, boiling water will only kill microorganisms. It does not remove contaminants. Chemical treatments, such as iodine tablets, leave an aftertaste, and may produce an allergic reaction with some people. Also, chemical treatments will only kill microorganisms and do not remove contaminants. Only mechanical filtration systems successfully remove contaminants except for viruses from contaminated water. Typically, mechanical filtration units are of two types, passive filtration units and pump filtration units.

Passive filtration systems typically use a water bag having a filtration system in the bottom of the bag. Water is poured into the bag which is then hung onto a tree or elevated structure. Water flows downward under the force of gravity through the filters in the bag and into a reservoir. This type of system is cumbersome to transport, operates slowly and requires frequent replacement of the filters due to bacteria growth in the filters.

There are presently several pump-type water filters available on the market. One such device is the FIRST NEED WATER FILTER, available from General Ecology, Inc. 151 Sherree Blvd, Lionville, Pa. This filter uses a handle to move a pump piston vertically in a cylinder. A canister containing a solid block carbon filter is mounted parallel to the cylinder and is connected by plastic tubing to the cylinder. The bottom of the cylinder has another piece of tubing which is placed in the water source. The bottom of the canister has a short piece of tubing which is placed in the water container. Operation of the handle pumps water through the canister to filter the water. This system weighs approximately sixteen ounces and requires frequent sterilization of the filter by halogen to prevent bacteria growth. The canister requires replacement at periodic intervals. The replacement canisters are relatively expensive. This system, under normal usage, filters water at the rate of one quart per ninety seconds. A prefilter is recommended for use with this system.

Another portable water filter is manufactured by Katadyn. This system uses a ceramic filter and a handle type pump to move water through the system. This system is expensive compared with other devices.

A third commercially available water filter pump is the MSR WATERWORKS FILTER, manufactured by Mountain Safety Research, Seattle, Wash. This system uses a small pump with a lever to pump water through a series of filters. These filters include an articulated urethane foam prefilter, a fine mesh stainless steel screen, a cylinder of activated carbon and a micro-porous membrane cartridge having a pore size ratio of 0.1 micron absolute. The replacement filters are relatively expensive. The approximate weight of this system is 20 ounces. Other devices are known that use a separate pump and filter mechanism. These devices are cumbersome to operate and are relatively slow to filter water.

The prior filtration systems are relatively cumbersome to store and to use. None of these units has the capacity to fold for compact storage. Also, these units require two hands to operate. This creates an opportunity for spillage of the filtered water.

It can therefore be seen that there presently exists a need for a lightweight, compact, inexpensive water filtration pump that operates with uniform flows at high rates without extensive exertion.

SOLUTION TO THE PROBLEM

The present invention comprises a solution to the above problems by providing a lightweight pump capable of compact storage and the filtering of fluid at high rates with minimal exertion.

The present invention comprises a portable, manually-operated, water filtration pump for filtering contaminated water. The pump uses a lever for actuating a piston at a mechanical advantage. When not in use, the lever is collapsible to one side of the pump for compact storage. In use, the lever is easily secured to a piston rod and piston for actuation of the pump. In the most preferred embodiment, the lever is secured onto the piston by a "capture pin" which engages a dent to fasten the handle to the piston.

The pump includes an inexpensive, disposable multi-layer filter cartridge which can be easily changed when its filter elements are no longer effective. In one embodiment, the filter cartridge has an inner bore through which the piston is movable.

An inlet is located at the bottom of the inner bore of the pump. A check valve is provided adjacent the inlet to allow water to enter the pump during the upstroke of the piston and to prevent water from leaving through the inlet during the downstroke of the piston. A flexible seal operating as a check valve is provided on the piston to prevent water from flowing around the piston during the upstroke and to allow water to flow around the piston during the downstroke. This provides a double-acting piston for uniform fluid flow and uniform pressure during the pumping process.

Water is pumped from the inner bore, impinges against a baffle and enters an inner plenum of the cartridge. The baffle prevents a high velocity fluid jet flow from the pump cylinder from striking the filter. The baffle also assures a laminar flow into the inner plenum adjacent an inner filter layer of the cartridge. The inner plenum has an annular width chosen to minimize pressure drops and to provide uniform water flow through the filter. This laminar flow and minimal pressure drops reduce the work of the pumping process as well as minimizing erosion of the pump and filters.

A cylindrical mechanical filter of the cartridge is concentric with and surrounds the inner bore of the pump cylinder adjacent the inner plenum to filter out particulates larger than 0.1 micron. A fluidized granular activated carbon filter is concentric with and surrounds the mechanical filter to absorb halogens and halogen-related compounds such as herbicides and pesticides. A screen prevents the granular activated carbon from exiting the pump with the filtered water.

An outer plenum is provided for the filtered water to exit the carbon filter with a uniform flow. The outer plenum is connected through an outlet barb and a flexible tube to a bottle adaptor which fits most standard water containers. The adaptor prevents spillage of the treated water in the container during the pumping process or contamination of the treated water.

A prefilter is provided in accordance with the present invention to screen out large particulates from entering the pump to enhance the life of the cartridge filter elements. The prefilter has an offset inlet opening so the prefilter sinks in water sources with the inlet staying upright in still water or downstream in moving water.

The pump portion of the present invention is designed to be relatively inexpensive with recyclable inexpensive filters. The pump is lightweight, approximately 0.25 to 0.32 pounds, capable of pumping greater than 1.0 liters per minute in normal use and is compact, about eight inches long with a diameter of about 2 inches. The pump is formed of lightweight durable components to withstand rugged use and can be easily used by one person.

In accordance with a first embodiment of the invention, the pump piston is slidably attached to the body of the pump assembly by a piston rod. The wall of the cylinder within which the piston slides comprises the inner wall of the filter cartridge. The inner plenum that receives the water pumped by the piston comprises an annular space between the cylinder wall and the inner wall of the mechanical filter element of the filter cartridge. The pump inlet comprises a part of the bottom portion of the filter cartridge.

In accordance with a second embodiment of the invention, both the pump piston and cylinder are a part of the body of a pump assembly. The pump inlet comprises a part of the lower portion of the pump assembly body. The inner plenum comprises an annular space between the outer wall of the pump cylinder and the inner wall of the mechanical filter element of the filter cartridge.

These and other features will become evident from the detailed description of preferred embodiments taken in conjunction with the drawing.

BRIEF DESCRIPTION OF THE DRAWING

FIG. 10 is a side cutaway view of the prefilter in moving water;

FIG. 11 is a side view showing a second embodiment of the collapsible pump handle;

FIG. 12 is a top view of the collapsible pump handle of FIG. 11;

FIG. 17 is a perspective view of a second embodiment of the bottle adaptor of the present invention;

FIG. 18 is a side cutaway view along lines 2—2 of FIG. 11 mounted on a water container.

DETAILED DESCRIPTION OF A PREFERRED EMBODIMENT

The present invention comprises a portable compact lightweight water filtration pump which effectively filters particles down to 0.2 microns. The pump is easily usable by one person with minimal exertion and provides greater than 1.0 liters per minute with normal usage. The pump is relatively inexpensive and uses inexpensive, disposable filters which filter up to 200 gallons of water.

A first possible preferred embodiment is illustrated in FIGS. 1–6 wherein the pump includes a pump housing, a filter cartridge, and a double-acting piston, all of which are discussed in detail below.

Pump Housing

Figure 1:
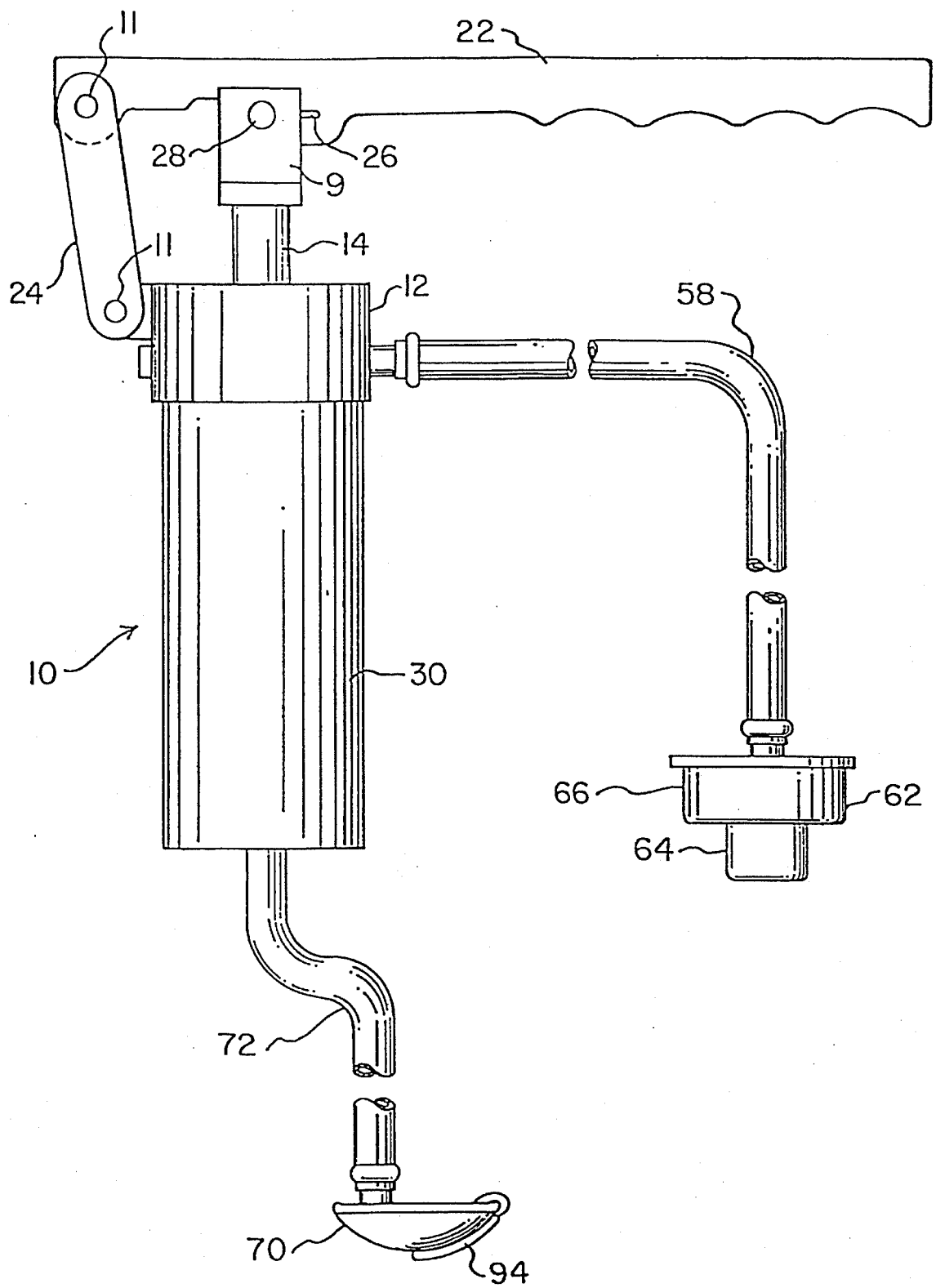
FIG. 1 is a side view of one possible preferred exemplary embodiment of the invention.

Water filtration pump 10 of the present invention is shown in FIG. 1 and includes prefilter 70 and container adapter 62. Pump 10 includes pump housing 12 and filter cartridge 30 having a cylindrical shape and an inner bore 36 (FIG. 2) in which piston rod 14 is slidable. Piston 16 is formed or affixed to the lower end of piston rod 14. Seal groove 18 is formed around the circumference of the mid portion of piston 16 as described below. O-ring or U-cup seal 20 or any well-known type of seal is mounted in the upper portion of housing 12 and allows piston rod 14 to pass through housing 12 while preventing water from the force of piston 16, as described below, from passing upward through housing 12. It also prevents contaminates from passing down through housing 12 into cylinder bore 36. Cross head 9 is affixed to the upper end of piston rod 14.

Figure 2:
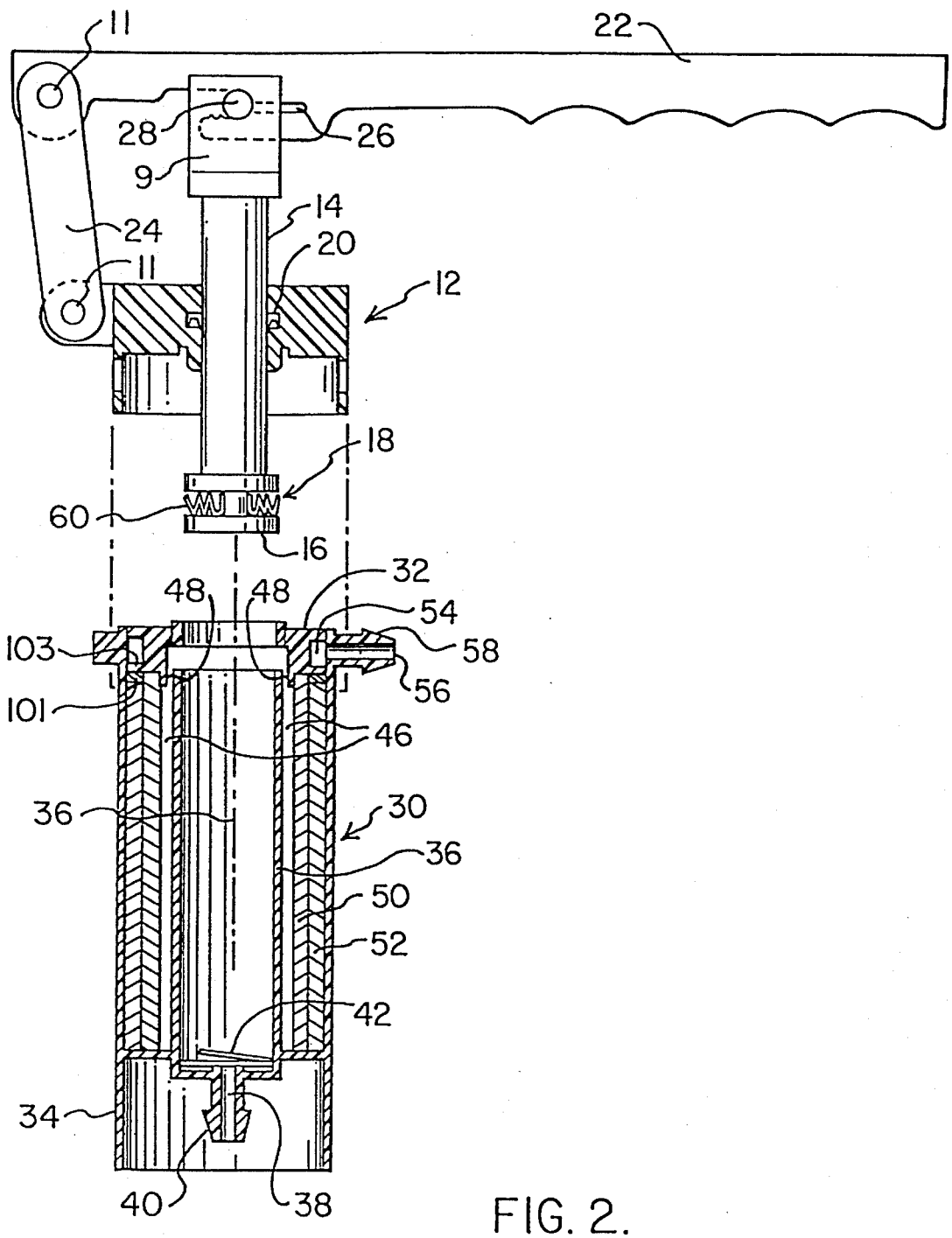
FIG. 2 is a cutaway view of the pump of FIG. 1 disassembled from the disposable filter cartridge.

Slot 26 of lever 22 engages pin 28 on cross head 9. Lever 22 is also attached to housing 12 by pivot link 24 and pins 11 (FIG. 2). This allows lever 22 to move piston 16 up and down in bore 36 of cartridge 30 with a mechanical advantage. The mechanical advantage is approximately three to five times. This enables the lever to provide three to five times the force as would the same effort moving piston 16 up and down without the lever advantage.

Figure 3:
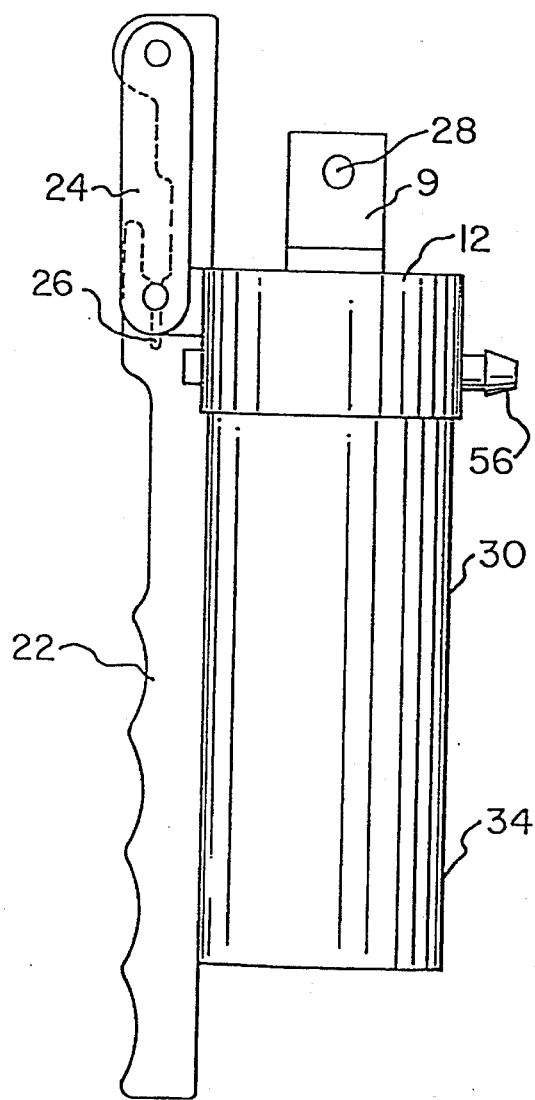
FIG. 3 is a cutaway view of the pump of FIG. 1 with the handle in the storage position.

Lever 22 can be moved to a storage position when pump 10 is not in use. In so doing, lever 22 is disengaged from pin 28 and collapsed to one side of pump 10 as shown in FIG. 3. This provides a compact unit for storage and transportation. This is an important concern for travelers and backpackers who have limited space available to store the pump.

Filter Cartridge

Filter cartridge 30 can be quickly and easily attached to housing 12. In the described preferred embodiment, this is accomplished by a threaded mounting (not shown) similar to that of the embodiment of FIGS. 8 and 9. The upper portion of filter cartridge 30 is screwed or otherwise engaged with the lower portion of housing 12 and rotated until the engagement is secure. Seal 32 (FIG. 2) between housing 12 and filter cartridge 30 prevents leakage at the connection between the housing 12 and filter cartridge 30. The present invention is not meant to be limited to this descriptive embodiment but encompasses other variations. For instance, the filter cartridge may use a bayonet attachment, or a snap-on attachment, or other well-known attachment devices.

Filter cartridge 30 (FIG. 2) includes outer tubular plastic wall 34. Inner bore 36 of filter cartridge 30 has an inner diameter comprising a cylinder wall for piston 16 to closely fit within along with a flexible seal as discussed below. At the lower end of inner bore 36 is an inlet 38 for enabling unfiltered water to enter filter cartridge 30. In the preferred embodiment, inlet 38 includes a barb 40 onto which a section of tubing 72 (FIG. 1) is attached. Inlet check valve 42 is positioned in inner bore 36 adjacent the upper portion of inlet 38. Inlet check valve 42 is a cantilevered reed valve which allows water to enter filter cartridge 30 but prevents water from exiting through inlet 38. The operation of inlet check valve 42 is discussed in detail below.

Double-Acting Piston

Figure 4:
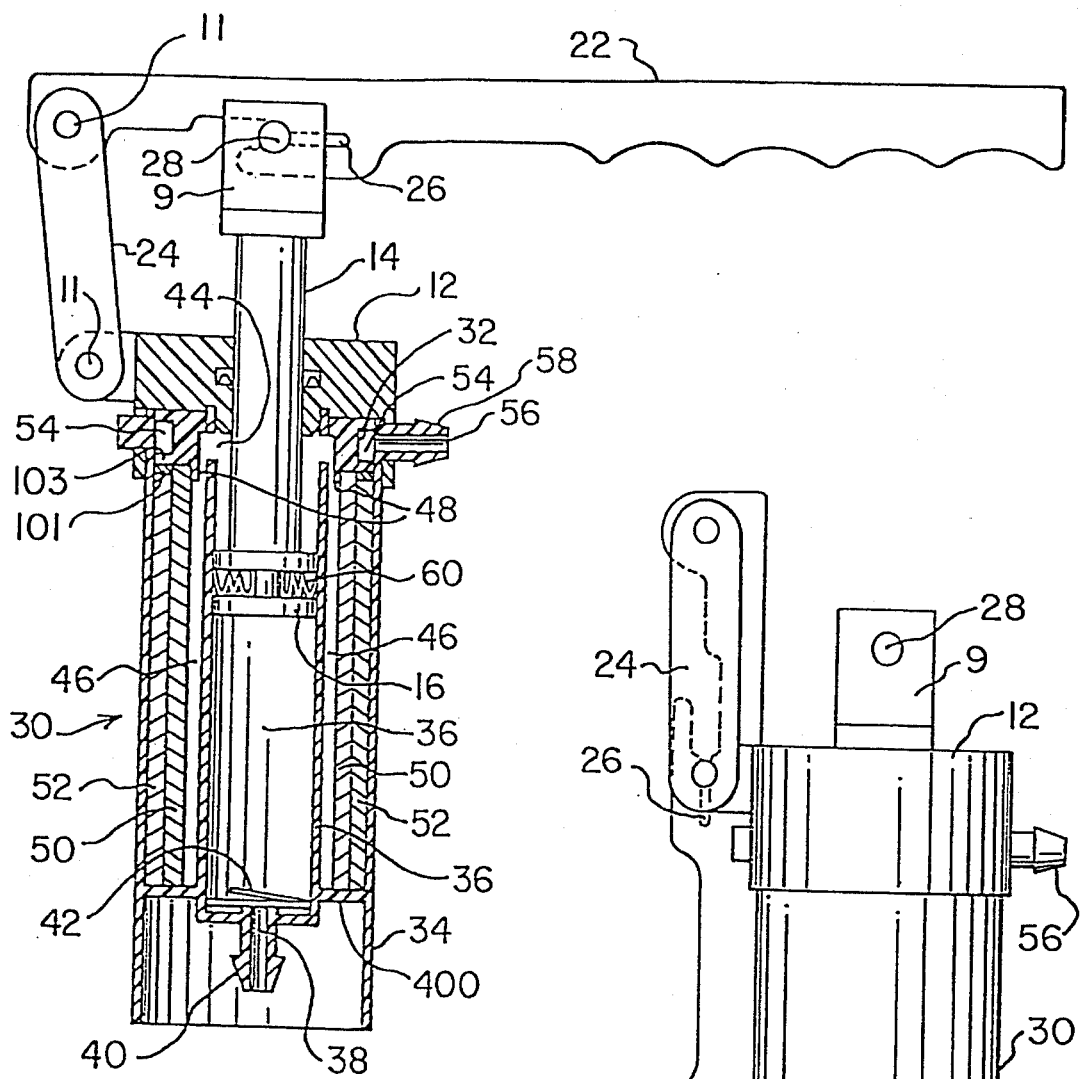
FIG. 4 is a cutaway view of the pump of FIG. 1 with the handle in the operating position and the piston in an upstroke.
Figure 5:
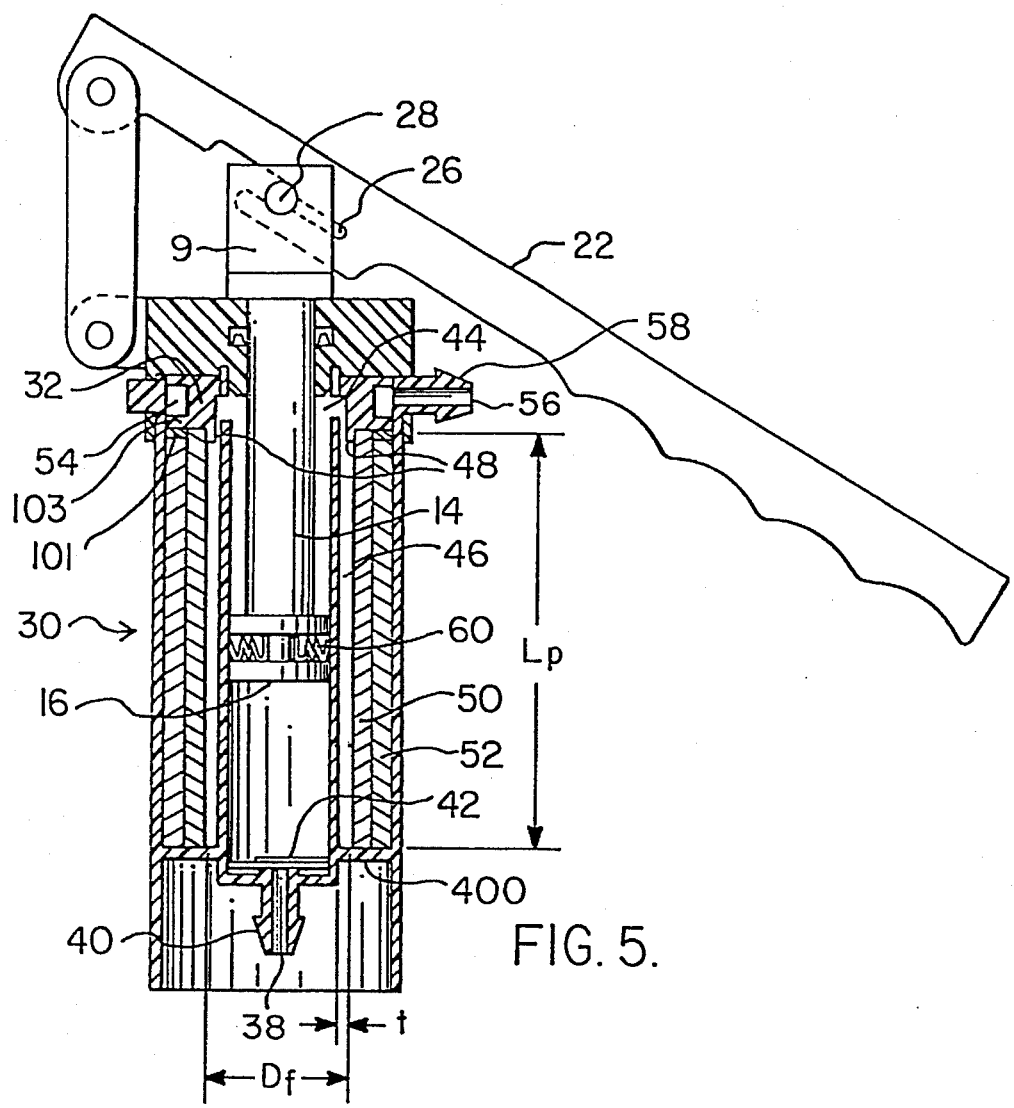
FIG. 5 is a cutaway view of the pump of FIG. 1 with the piston in a downstroke.

Flexible seal 60 is mounted within groove 18 of piston 16 as illustrated in FIGS. 2, 4 and 5. Seal 60 is formed from an elastomer or an elastomer-like thermoplastic. Seal 60 allows piston 16 to be double acting to provide uniform flow and pressure during both the upstroke and downstroke of piston 16. Seal 60 has an accordion-like, flexible lip that moves toward the wall of inner bore 36 during the piston upstroke so water above piston 16 (FIG. 4) is directed again through baffle 48 and flows downward into inner plenum 46. At the same time, water is drawn upward through inlet 38 and through the open inlet check valve 42 as shown in FIG. 4. The outer lip of seal 60 moves away from the wall of inner bore 36 during the downstroke of piston 16 by the force of the water against seal as shown in FIG. 5. The water below piston 16 is then initially forced downward in bore 36. This closes cantilevered reed check valve 42 to force the water upward around piston 16 and past seal 60 as shown in FIG. 5.

Filters

Inlet 44 of cartridge 30, shown in FIGS. 4 and 5, is formed at the upper end of inner bore 36 leading into inner plenum 46. Inner plenum 46 surrounds inner bore 36 and is critically sized as shown below:

$$R_N = \frac{2QL_p}{NP_{eff}D_f}$$

wherein:
$R_N$=a dimension-less number ranging between 500 and 1500;
N=kinematic viscosity of the fluid;
Q=volumetric flow rate through said plenum;
$L_p$=effective length of said plenum;
$P_{eff}$=effective wetted perimeter of said plenum;
$P_{eff}=\pi(D_p+D_f)$;
$D_f$=inner diameter of said filtering means adjacent said plenum; and
$D_p$=plenum diameter.

Baffle 48 is formed adjacent inlet 44 to prevent high jet velocity water flow from bore 36 from striking inner plenum 46 and to provide laminar flow from bore 36 into inner plenum 46. Non-laminar flow results in uneven flow, high pressure drops and increased work. Also the life of the pump and filter is reduced due to erosion of the filter wall. Baffle 48 is formed of a non-erodible material such as structural plastic. Water flow from inner bore 36 is forced through inlet 44 against baffle 48 which directs the fluid flow downward to the surface of mechanical filter 50. This parallel flow encourages laminar flow. Also, the water is allowed to enter mechanical filter 50 more easily without increased pressure necessary.

Mechanical filter 50 is adjacent inner plenum 50 and is a borasilicate cylinder, or a plastic membrane cylinder, or a porous plastic tubular cylinder having pores filtering out particles having a size greater than 0.2 to 1.0 microns from exiting the pump. In the preferred embodiment, 0.2 microns is used as the filter size. This size effectively filters most particle contaminates that may feasibly be filtered. Trapped particle contaminates can be backwashed to eliminate the buildup of particles in the pump. Mechanical filter 50 is sealed at the top against element 32 and at the bottom against the lower end 400 of filter cartridge cylinder 30 (FIG. 5).

Granular activated carbon bed 52 surrounds mechanical filter 50. Granular activated carbon bed 52 is a tubular cylinder formed from packed granular activated carbon with a particle size to maximize adsorption of halogens, halogen-related products and other chemicals, such as herbicides and pesticides. The packed granular activated carbon provides an efficient adsorption rate with a low pressure drop.

The lower end of packed granular activated carbon filter bed 52 is sealed by mechanical interference with a lower portion 400 of filter cartridge 30. A porous seal 101 and a retainer ring 103 are positioned on the top end of carbon filter 52. Porous seal 101 prevents carbon particles from the carbon filter from exiting the filter cartridge. Exit plenum 54 is formed around the top side of retainer ring 103. Exit plenum 54 is in the shape of an annular ring. The dimensions of exit plenum 54 are critically selected to provide uniform flow rates through carbon filter 52 and mechanical filter 50. Outlet 56 is connected to exit plenum 54 and includes a hose barb 58 for attachment to a section of tubing as discussed below.

Uniform Fluid Flow Through the Pump

The pressure drop across the filter elements 50' and 52' may be characterized as $\Delta P = C_1 Q^N$ where ΔP=pressured drop across filter where $C_1$=filter resistance which is a function of filter-design and the amount of particles the filter has retained where N=1 for laminar flow; 2 for fully turbulent flow; and between 1 and 2 for transition flow (laminar to turbulent)

The minimum work to pump a given amount of water through the filter occurs at a uniform flow rate. In a double acting piston pump, the minimum work occurs when the flow rate is the same in the "up" and "down" strokes.

The use of a double-acting piston with the same flow rate in the "up" and the "down" stroke provides a uniform flow rate, and thus a minimum pressure drop in the pump and filters. This reduces the force necessary to operate the pump and reduces the potential of damage to the filter elements and to the pump. The equal volume in both directions of the double-acting piston, the critical dimensions of the inner and outer plenums and the use of laminar flow into the inner plenum minimize pressure drops and uneven turbulent flow to reduce the "work" in operating the pump of the present invention.

The internal volume of inner bore 36 and the dimensions of piston rod 14 are selected under the teachings of the present invention so the volume of water displaced during the upstroke of the piston is approximately equal to the volume of water displaced during the downstroke of the piston. This assures uniform flow and minimal pressure drop. The water displaced in the upstroke is equal to the volume of the inner bore 36 minus the volume of piston rod 14. The water displaced in the downstroke is equal to the volume of piston rod 14. Therefore, the volume of piston rod 14 must be small compared to the volume of inner bore 36. (Volume piston rod 15<0.1 volume bore 36.) The dimensions of piston rod 14 and inner bore 36 can thus be varied to achieve the desired dimensions.

The dimensions of inner plenum 46 are also selected under the teachings of the present invention to minimize pressure drops and to provide uniform flow through pump 10. Inner plenum 46 is designed as an annulus surrounding inner bore 36 with a length $L_p$ and width t between the range of 0.02 to 0.05 of the inner diameter of the filter. A width smaller than this range creates a slight pressure drop in inner plenum 46. A width greater than this range permits water to collect at the bottom of the plenum 46 and causes non-uniform flow through the filter creating high pressure drops in the filter. In the preferred embodiment, shown in FIG. 5, width t (distance between outside of inner bore 36 and inner surface of the filter) of inner plenum 46 is critical. This dimension is a function of the geometry of the filter system and of the flow rate. This function can be expressed in dimension-less numbers as follows:

$$R = \frac{\dot{V} D_p}{\mu} K \quad (2)$$

wherein:
$\dot{V}$ = water velocity through plenum
$\mu$ = water viscosity $D$ = effective plenum dimension = $4 \frac{A}{P}$ $A$ = cross-section area of plenum $K = \frac{L_p}{D_f}$ $L_p$ = plenum length
$D_f$ = filter inner diameter Operation of the First Preferred Embodiment In the first preferred embodiment, pump 10 is designed for lightweight, compact storage for use in travel or backpacking. Pump 10 has an overall length with lever 22 in storage position of about eight inches with filter cartridge 30 having a two inch diameter and a five inch length. The overall weight is about 0.5 pounds. Pump 10 filters water under normal usage at a rate greater than 1.0 liters per minute. Filter cartridge 30 will last for approximately 100 hundred gallons under normal usage. Filter cartridge 30 is inexpensive and easily replaced after its filter elements 50 and 52 are no longer effective. Also, filter cartridge 30 may be replaced after periods of non-use in order to prevent the effects of bacteria growth if the filters were not sterilized after use. The used filter cartridges are designed to be recyclable. These design parameters are for descriptive purposes. Other sizes and designs are considered to be encompassed by the claimed invention.

Pump 10 and the housing of filter cartridge 30 are formed from polycarbonate or another appropriate structural plastic with lever 22 formed from glass-filled or graphite fibre filled polycarbonate or another appropriate structural plastic to be lightweight yet durable. Mechanical filter 50 is formed from borasilicate, or porous plastic so as to be durable. Previous devices using silver impregnated ceramic tended to be fragile, with some fear of the effect of silver impregnation on drinking water. The use of packed granular activated carbon provides a more efficient adsorption with a lower pressure drop than many carbon filters. The above description is for explanatory purposes and is not meant to limit the invention as claimed. Other materials, pump designs and filter designs are considered to be within the claimed inventive concept.

Pump 10 is transported with lever 22 in the storage position as shown in FIG. 3. When it is desired to purify water from a water source, lever 22 is unfolded so that its slot 26 engages pin 28 of cross head 9. Water container adaptor 62 (FIG. 1) or 620 (FIGS. 11–13), discussed below, is inserted into the opening of a water container. Prefilter 70 (FIGS. 1 and 6), discussed below, is dropped into the water source. Lever 22 is operated up and down to pump water from the water source through prefilter 70 and into pump 10. The water is moved in a uniform laminar flow by double-acting piston 16 from bore 36, against baffle 48, into inner plenum 46, through mechanical filter 50 to remove particulate contamination, and then through carbon-bed 52 to remove chemical contamination. The water is then pumped through outlet plenum 54 and outlet 56 and tube 58 (FIG. 1) into a water container.

After approximately 200 gallons have been pumped or after extended periods of non-use of the pump, filter cartridge 30 can be quickly and easily replaced by a new filter cartridge. The old filter cartridge is then able to be recycled.

Second Pump Embodiment

Figure 8:
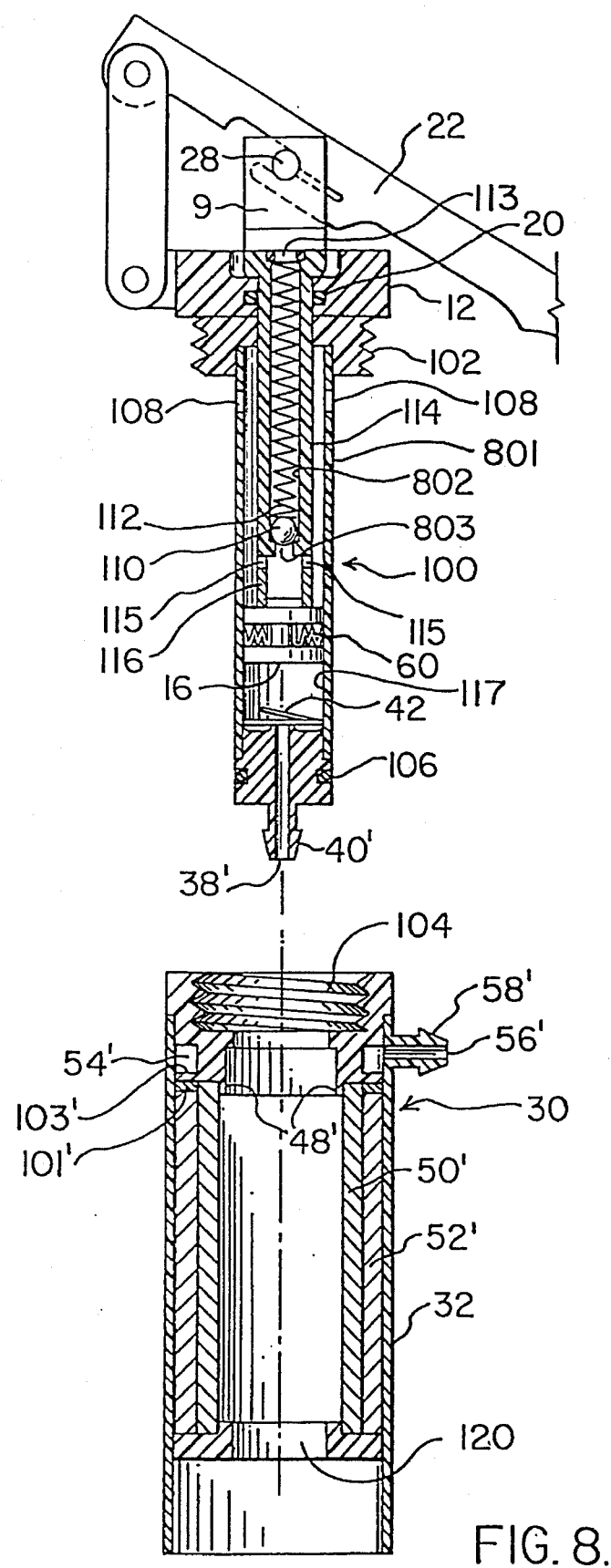
FIG. 8 is a cutaway view of a second preferred embodiment of the present invention.
Figure 9:
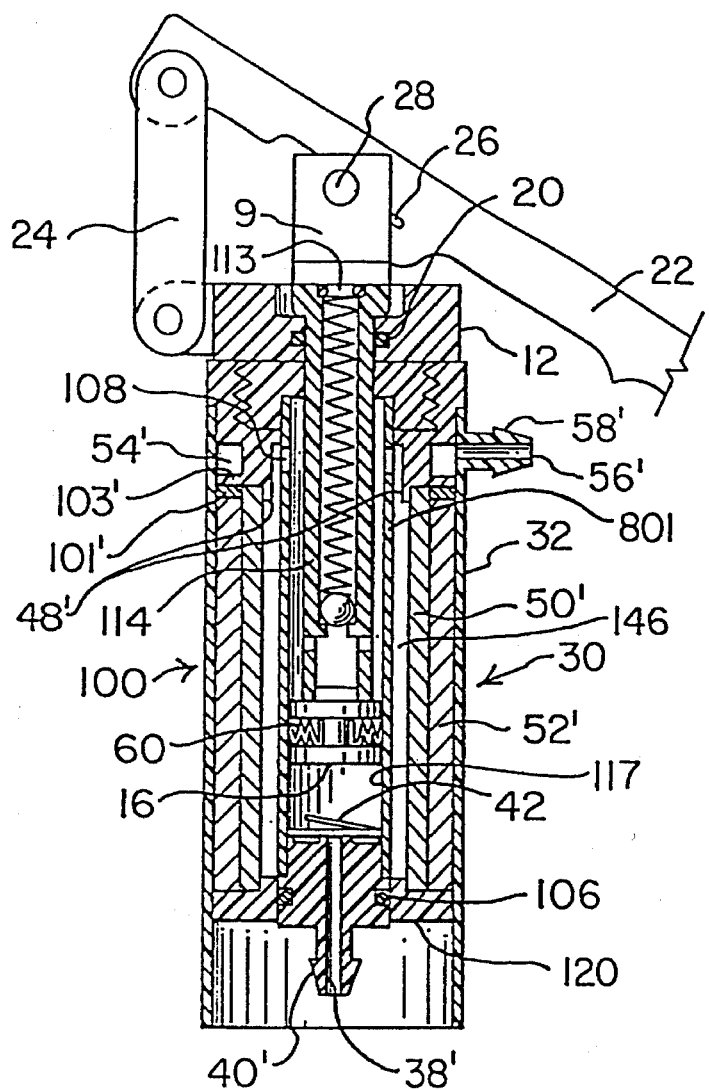
FIG. 9 is a cutaway view of the embodiment of FIG. 8 assembled.

A second possible and most preferred embodiment of a pump 10 is illustrated in FIGS. 8 and 9. Pump 10 comprises pump housing 12, lever 22, a pump cylinder 100 and a cartridge filter 30. This embodiment operates similar in many ways to the above-described embodiment. Pump cylinder 100 is formed on pump housing 12 and includes threaded portion 102 which mates with threaded portion 104 on filter cartridge 30. Filter cartridge 30 has an inner mechanical filter 50', identical to filter 50 described above, carbon bed 52', identical to carbon bed 52 described above, and outlet plenum 54' and outlet 56', which are similar to corresponding elements 54 and 56 described above. A perforated retainer ring 103 and a porous seal 101 separate carbon filter 52 and outlet plenum 54.

Pump cylinder 100 includes an inlet opening 38' which extends through inlet valve 42 into bore 117 of inner pump cylinder 100. U-cup or O-ring 106 is mounted near the bottom of inner pump cylinder 100 adjacent inlet opening 38' and barb 40'. Inner pump cylinder 100 has a thin-walled casing 801 and bore 117 in which piston 16 is movable. Seal 60 in grove 118 of piston 16 interacts with inlet valve 42 to provide the double-acting performance described above for the first embodiment. O-ring 20 performs the same function as does o-ring 20 of FIG. 2.

A pressure relief valve 110 is illustrated in FIGS. 8 and 9 and includes a ball 110 and spring 112 positioned in passage 802 in the interior of piston rod 114 above piston 16. Longitudinal passage 802 is formed in piston rod 114 and has an exit opening 113 in the top of passage 802 and an inlet opening 100 formed in seat 803 in piston rod 114. Spring 112 biases ball 110 downward against seat 803. The bias is selected so that when pressure builds up in pump cylinder due to clogging of the mechanical filter 50' or other causes, ball 110 is forced upward against spring 112 to allow water to flow laterally through inlet 115, upwards in passage 802 and out of exit hole 113 in the top of the pump to relieve the pressure build up. O-ring 20 seals piston rod 114 to prevent fluid from entering or exiting the top of the pump. Exit opening 113 is part of a retainer ring that holds spring 112 in place. If desired, the pressure relief valve of FIGS. 8 and 9 may also be used with the first described embodiment of FIGS. 1–7.

Pump cylinder 100 is affixed to pump housing 12. O-ring 106 seals the lower portion of inner pump cylinder 100 against lower portion 120 of the filter cartridge housing 30. The space between the outer wall 801 of pump cylinder 100 and the inner wall of mechanical filter 50' forms an inner plenum 146 spaced as shown on FIG. 9. Inner plenum 146 is comparable in function to inner plenum 46 of FIG. 4.

In operation, the fluid pumped by piston 16 through inlet 38', upwards in bore 117, passes from bore 117 and through opening 108 and strikes baffle 48. The water is forced downward by baffle 48' with a laminar flow into inner plenum 146. From there, the water passes transversely through mechanical filter 50' and carbon filter 52'. The water flows upward through carbon filter 52', through porous element 101, perforated retainer 103 to outlet plenum 54. From there, the water passes through pump outlet 58' and a tube and bottle adaptor similar to elements 58 and 62 of FIG. 1 to a bottle or container.

The pump works as does the earlier described embodiment to provide uniform pressure and flow through the pump. The second embodiment of FIGS. 8 and 9 allows a more inexpensive filter cartridge to be used, since the inner pump cylinder remains with the pump housing.

Second Lever Embodiment

A second and most preferred embodiment of the attachment of lever 22 to a cross head 8 and piston 12 is shown in FIGS. 11–16. Lever 220 is similar to lever 22 in function. Lever 220 includes a textured gripping portion 222 for ease in grasping lever 220. Lever 220 also includes rectangular reduced portion 224 (FIG. 11) with reduced width portions 226, 228 (FIG. 11) to reduce the overall weight of the pump. Attachment means 230 of lever 220, shown in FIG. 11 includes a circular hole portion 232 having hole or keyway portions 234 superimposed on the circumference of hole portion 232.

Mid link 240 (FIG. 11) having a reduced width portion 242 pivotally secured at its upper end to handle 220 by pin 244. The opposing lower end of mid link 240 is pivotally secured onto collar 250 by pin 246. Lever 220 is thus able to be pivoted against pump 30, as shown in FIG. 11, for compact storage.

Piston assembly 8 (FIG. 11) includes a cross head 260 (comparable to cross head 9 of FIG. 1) and a piston rod 12 (not shown) and a piston 16 (not shown) since they are comparable to elements 12 and 16 of the embodiment of FIGS. 1–5. Cross head 260 is affixed to the top of piston rod 12 (not shown) to move piston 16 with a mechanical advantage. Cross head 260, as shown in FIG. 12, includes rectangularly shaped slot 262 in the top of cross head 260 and a substantially circular hole 264 in the lower wall 270 of slot 262 and extending perpendicular to slot 262. Slot 266 extends along one side of hole 264, as discussed in detail below, and terminates in upper end wall 268. Lower wall portion 270 is formed on cross head 260 opposite top end wall portion 268.

Cam surface 272 (FIG. 11) is formed on outside of lower wall portion 270 (FIG. 12) beginning at the terminus of slot 266 and forming an outwardly sloping ramp surface on the outer surface of wall portion 270. Cam surface 272 starts in slot 266 and terminates after a 270 degree rotation in detent slot 276 (FIGS. 11 and 12).

Captured pin assembly 280 (FIG. 12) includes handle 282 and backing flange 284 affixed to the top end of pin portion 286 which is formed of a low friction material and has a diameter to closely fit within hole 264. Pin 288 extends perpendicularly out of one side of the lower end of pin 286. Pin assembly 280 (FIG. 12) is assembled onto cross head 260 by inserting pin 286 through hole 264 so that its lower end extends out of lower wall portion 270. Pin 288 is then inserted into the lower end of pin 286 to "capture" pin 286 onto cross head 260. Upper end wall 268 of hole 264 prevents pin 280 from exiting cross head 260.

Figure 13:
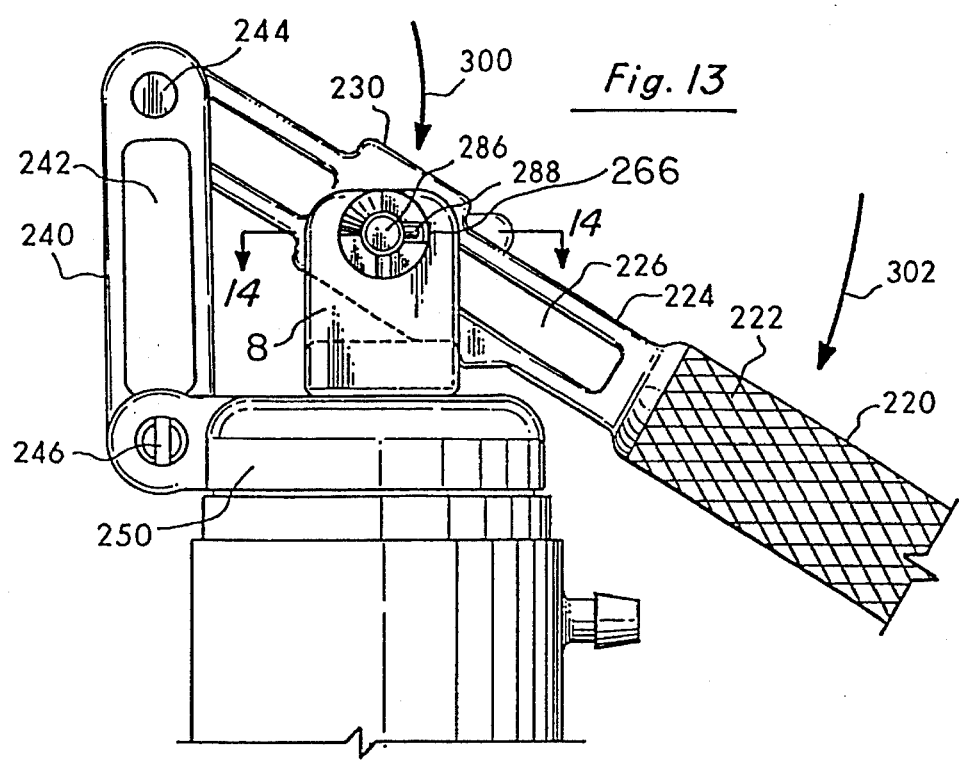
FIG. 13 is a side view of the collapsible pump handle of FIG. 11 secured on the piston.
Figure 14:
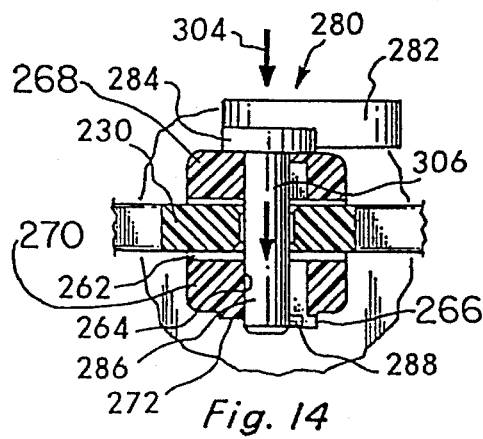
FIG. 14 is a top view of the pump handle of FIG. 11 in a first stage of mounting.
Figure 15:
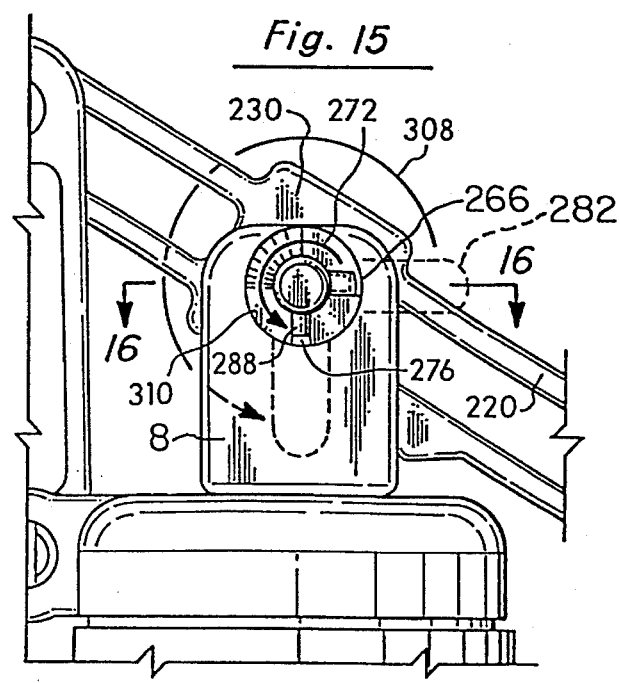
FIG. 15 is a side view of the pump handle of FIG. 11 in a second stage of mounting.
Figure 16:
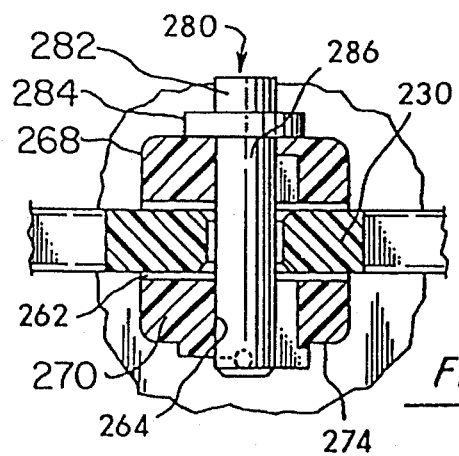
FIG. 16 is a top view of the apparatus of FIG. 15.

Lever 220 is moved from the storage position, shown in FIG. 11 to the operating position, as indicated by arrows 300, 302 shown in FIG. 13, when pump 30 is to be operated. Mid portion 230 of lever 220 (FIG. 12) is inserted into slot 262 of cross head 260 so that hole 232 (FIG. 11) of handle portion 230 is aligned with hole 264 in cross head 260. In this position, key slot 234 (FIG. 11) will also be aligned with slot 266. Pin assembly 280, as shown in FIG. 14, is then pushed, as indicated by arrows 304 and 306 (FIG. 14) through hole 264 of cross head 260 and hole 232 of lever 220. Once pin 288 clears hole 264, handle 282, as shown in FIG. 15, is rotated counterclockwise, as indicated by arrow 308. This causes pin 288 to move against sloping cam surface 272 as indicated by arrow 310 (FIG. 15). Pin 286 and cross head 260 are resiliently compressed by the action of pin 288 against sloping cam surface 272 so that as pin 288 enters detent slot 276, pin 288 (FIGS. 15 and 16), is resiliently biased into detent slot 276. Thus, lever 220 is securely affixed to cross head 260. Lever 220 can then be moved up and down to move piston 12 within the pump cylinder to force fluid through the filter.

To prepare pump 30 for storage, the procedure is reversed. Pin 288 is rotated clockwise (FIG. 13) until pin 288 is aligned in slot 266. Handle 282 is withdrawn until pin 286 abuts against end wall 268. Lever 220 is then pivoted upward and away from the piston cam head 360 and against the wall of pump 30 as shown in FIG. 11. Pump 30 is then in its compact storage position.

Adaptor

Pump outlet 56 is connected by tubing 58, (FIG. 1) to water container adaptor 62. Adaptor 62 is designed to fit closely within the openings of most standard water containers. In one preferred embodiment, shown in FIG. 1, adaptor 62 has a first section 64 to fit smaller openings and a second section 66 to fit larger openings. This allows hands free operation of the device without having to hold the water container being filled. The fit of adaptor within the water container opening is such that should the water container tip or fall over, filtered water will not spill out and contaminates will not enter the water container. Adaptor 62 can also be designed to screw into the openings of the water containers. Tubing 58 can be clamped or bonded onto pump hose barb 56 and onto adaptor 62 if desired.

Second Bottle Adaptor

Figure 19:
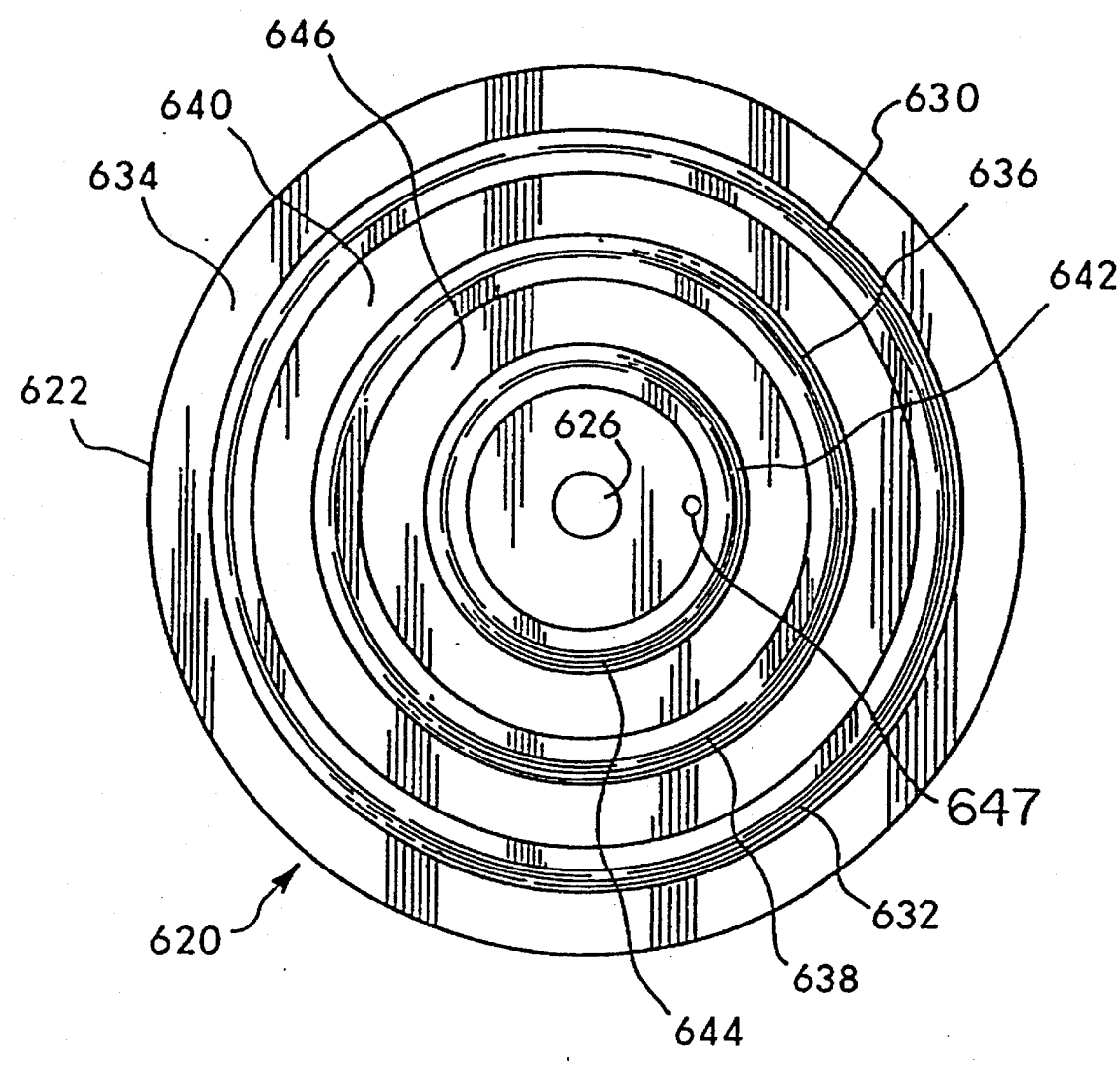
FIG. 19 is a bottom view of the bottle adaptor of FIG. 11.

A second and most preferred embodiment of bottle adaptor 62 is shown in FIGS. 17, 18 and 19. Bottle adaptor 620 (FIG. 17), includes a cylindrical portion 622. Cylindrical hose connector 624 extends upwardly from the center of the upper surface of cylindrical portion 622 for connection to outlet hose 58. Opening 626 (FIG. 12), extends through the center of hose connector 624 so that filtered fluid can be pumped through hose 58 and through adaptor 622. Air vent 647 is located adjacent the inlet 626 to allow the compressed air in the water bottle to leave the water bottle as the water bottle is filled.

A series of concentrically spaced rings 630, 636, 642 (FIGS. 18 and 19) extend perpendicularly downward from the lower surface of cylindrical portion 622. Rings 630, 636, 642 have outer diameters sized to respectively fit snugly within the openings of standard sized water containers. The lower edges 632, 638, 644 of each ring 630, 636, 642 are tapered to provide ease of insertion into the appropriate water container. Also, each ring 630, 636, 642 includes an upper sealing portion 634, 640, 646 to seal the water container from spillage. The adaptor is formed of a resilient material to allow the adaptor to snugly conform to the desired water container opening. Thus, different sizes of water containers can be easily filled with filtered fluid by hands-free operation and without danger of spillage or contamination.

Prefilter

Pump filter cartridge inlet 38 (FIG. 2) is connected to prefilter 70 (FIG. 1) by tubing 72. Pump inlet 38' (FIG. 8) may be similarly connected. If desired, tubing 72 can be securely attached by clamps or bonding to pump inlet 38 or 38' over pump inlet hose barb 40 or 40' and to prefilter 70 over prefilter hose barb 74 shown in FIG. 6. Typically, a 0.25 to 0.38 inch internal diameter elastomer or plastic tubing is used at a length up to 5 feet. Prefilter 70 is dropped into a water source to filter out large particle contaminates down to 70 to 120 microns in size. Pump 10, under normal usage, is able to "pull" water easily at least through an elevation of 5 feet. This allows the user to comfortably operate the pump without kneeling or actually getting into the water source.

Figure 6:
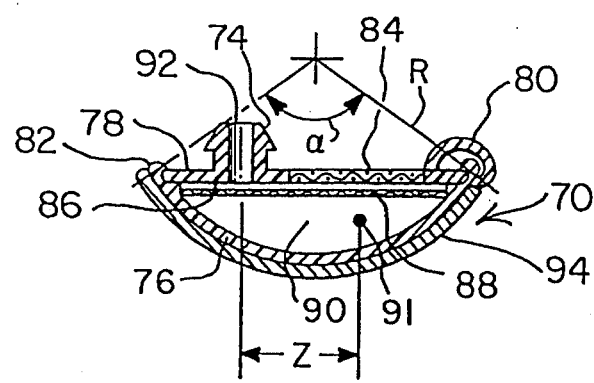
FIG. 6 is a cutaway view of the prefilter of the preferred embodiment.

As illustrated in FIG. 6, prefilter 70 has a semi-spherical shaped lower portion 76. It may also be of other shapes if desired. Inlet screen 84 comprises a molded or woven or metal mesh screen with 0.01 to 0.02 millimeter pore size, and is formed in upper portion 78. The prefilter fluid outlet comprises opening 92 in outlet barb 74 which may be connected by a flexible tubing 72 (FIG. 1) to a pump such as pump 10. The specific gravity of prefilter 72 is equal to or greater than 0.07 pounds per cubic inch to overcome any buoyancy in water. The center of gravity 91 of prefilter 70 is spaced from prefilter outlet 92 by a distance Z, as shown in FIG. 6. Filter screen 88 is mounted in the interior 90 of lower semi-spherical portion 76 and is formed of either metal or plastic and filtering particles larger than 70 microns.

Upper portion 78 of the prefilter is attached to lower portion 76 by living hinge 80 and snap-lock 82 so that upper portion 78 can be easily opened to clean prefilter 70. The specific gravity of prefilter 72 is equal to or greater than 0.07 pounds per cubic inch to overcome any buoyancy in water.

The geometry and weight of prefilter 70 are critically determined to insure that inlet screen 84 is under water in both still and moving water. The geometry also insures that inlet screen 84 is facing away from the bottom of a still water source and is held below the surface of the water in moving water. This minimizes the intake of particles into the prefilter. The weight of prefilter 70 provides an effective specific gravity (weight of prefilter/volume of prefilter) to have the prefilter below the water surface in still water. In moving water, the semi-spherical shape combined with the moment formed by the couple of the tube located a distance Z from the center of gravity 91, causes the prefilter to tilt in the moving water so that the water forces help hold the prefilter beneath the water surface with the surface of the inlet screen 84 being tilted from horizontal as shown in FIG. 10. Moving water is defined as flow velocity greater than 2 feet per second. In the preferred embodiment, prefilter 70 has a specific gravity greater than 0.07 pounds per cubic inch.

Prefilter 70 has a semi-spherical shape to maintain the inlet screen 88 facing away from the bottom of the water source in still water and tilted from horizontal in moving water. The prefilter housing is chosen to have a radius R with an included angle between ninety and one-hundred-forty degrees.

The geometry of the prefilter 70 causes the prefilter 70 to orient itself in moving water having a high fluid velocity so that the prefilter inlet screen 88 is facing upstream having a high fluid velocity. The prefilter tends to point upstream in water having a relatively low fluid velocity. This tilt is caused by the combination of the hydraulic forces on the spherical surface 94 of the prefilter and the moment caused by the distance between the outlet tube connection barb 74 and the center of gravity 91 of the prefilter. This distance Z must be 0.5 to 0.8 of the radius R of the sphere as shown in FIG. 6.

Weighted portion 94 is molded, formed or attached to lower portion 76 of prefilter 70. Weighted portion 94 can be attached to only a portion of lower portion 76 as shown in FIG. 1 or be attached to the entire lower portion 76 as shown in FIG. 6. Weighted portion 94 assists prefilter 70 to sink in moving and still water beneath the surface of the water source.

Figure 20:
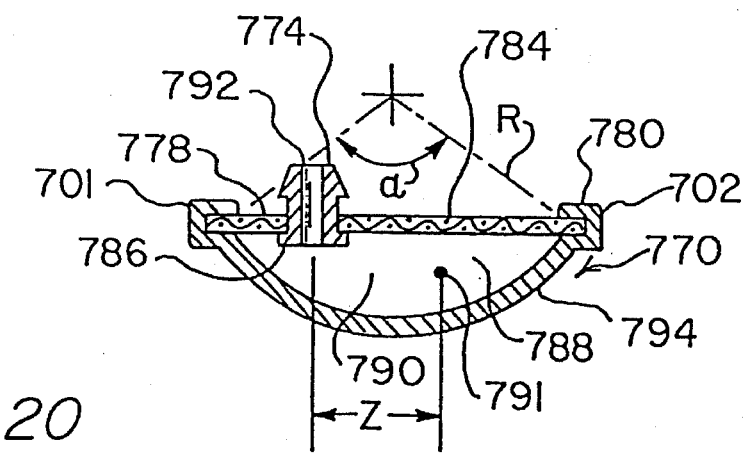
FIG. 20 is a cutaway view of an alternative prefilter.

FIG. 20 illustrates an alternative and most preferred prefilter embodiment that is similar in many ways to the prefilter of FIG. 6. Prefilter 770 of FIG. 20 has a semi-spherical shaped lower portion 794. It may be of other shapes if desired. It also has an upper portion 778 that is attached to lower portion 794 by edges 701 and 702 of lower portion 794 which are crimped out the left and right ends of upper portion 794. The prefilter inlet comprises a molded or woven or metal mesh screen 784 with 0.01 to 0.02 millimeter pore size which is formed in upper portion 778. The outlet of the prefilter comprises barb 774 having a center opening 792 for receiving a flexible tube or hose 72.

The specific gravity of prefilter 770 is equal to or greater than 0.07 pounds per cubic inch to overcome any buoyancy in water. The center of gravity 791 of prefilter 770 is spaced from opening 792 by a distance Z, as shown in FIG. 6. Inlet filter screen 784 is formed of either metal or plastic and filters particles larger than 70 microns.

The geometry and weight of prefilter 707 are critically determined to insure that inlet filter screen 784 is beneath the water surface in both still and moving water. The geometry also insures that inlet screen 784 is facing upwards and away from the bottom of a still water source and is tiled from horizontal in moving water. This minimizes the intake of particles into the prefilter. The weight of prefilter 770 provides an effective specific gravity (weight of prefilter/ volume of prefilter) to have the prefilter below the water surface in both still and moving water. In moving water, the semi-spherical shape combined with the moment formed by the couple of the tube opening 792 located a distance Z from the center of gravity, causes the prefilter to tilt from horizontal in the moving water so that the water forces help hold the prefilter below the surface of the water. Moving water is defined as flow velocity greater than 2 feet per second. In the preferred embodiment, prefilter 770 has a specific gravity greater than 0.07 pounds per cubic inch. The prefilter housing is chosen to have a radius R with an included angle between ninety and one-hundred-forty degrees.

The geometry of the prefilter 770 causes the prefilter 770 to locate in moving water tilted so that the inlet screen 784 of the prefilter is facing upstream as shown in FIG. 10. The amount by which the prefilter tilts in moving water is dependent upon factors such as the velocity of the water flow and the flexibility of the tube or hose 72 connected to outlet barb 774 of the prefilter. This tilt is caused by the combination of the hydraulic forces on the spherical surface 794 of the prefilter 770 and the moment caused by the distance between the outlet barb 774 and the center of gravity 791 of the prefilter. This distance Z must be 0.5 to 0.8 of the radius R of the sphere as shown in FIG. 14.

Operation of Prefilter 70 and 770 (FIGS. 6, 10, and 20)

Water is drawn by pump 10 through inlet screen 84 down through filter screen 88 into the prefilter interior 90. The water then is drawn through opening 92 up through tubing 72 into inlet 38 or 38' of filter cartridge 30 of pump 10. Prefilter 70 screens large particle-contaminates from pump 10 to increase the life of disposable filter cartridges 30. Upper portion 78 can be unsnapped to clean filters 86 and 88 as necessary. If desired lower portion 94 can be rolled over and permanently affixed to upper portion 78 if it is not desired to open prefilter 70 for cleaning.

The majority of contaminates are typically on the surface of a water source. Prefilter 70, by sinking below the surface in moving and still water, does not contact the surface contaminates. Additionally, in still water, prefilter 70 is held with inlet screen 84 in a horizontal position to prevent bottom dirt from being pulled into prefilter 70. Also, the offset location of the hose barb 74 causes a moment between the tube 72 and the center of gravity 91 of the prefilter 70. In moving water, this causes the lower portion 94 of the prefilter to tilt so that its upper portion 78 and inlet screen 84 are facing upstream in water having a high fluid velocity and hold the prefilter under the surface of the moving water as shown in FIG. 10.

Prefilter 70 is designed to be small, lightweight, inexpensive and to create an insignificant pressure drop to allow uniform flow through pump 10. In the descriptive preferred embodiment, prefilter 70 has an outer diameter of less than 1.75 inches and a pressure drop of less than 0.25 psi at a flow rate of 1.0 liters per minute. The prefilter 770 of FIG. 20 is similar in operation to that of prefilter 70 of FIG. 6.

Prefilters 70, 770 and water container adaptor 60 allows pump 10 to be used by a single person without the need for additional assistance or contortions in filtering from a stream or other water source.

Additional Conditioning Units

Figure 7:
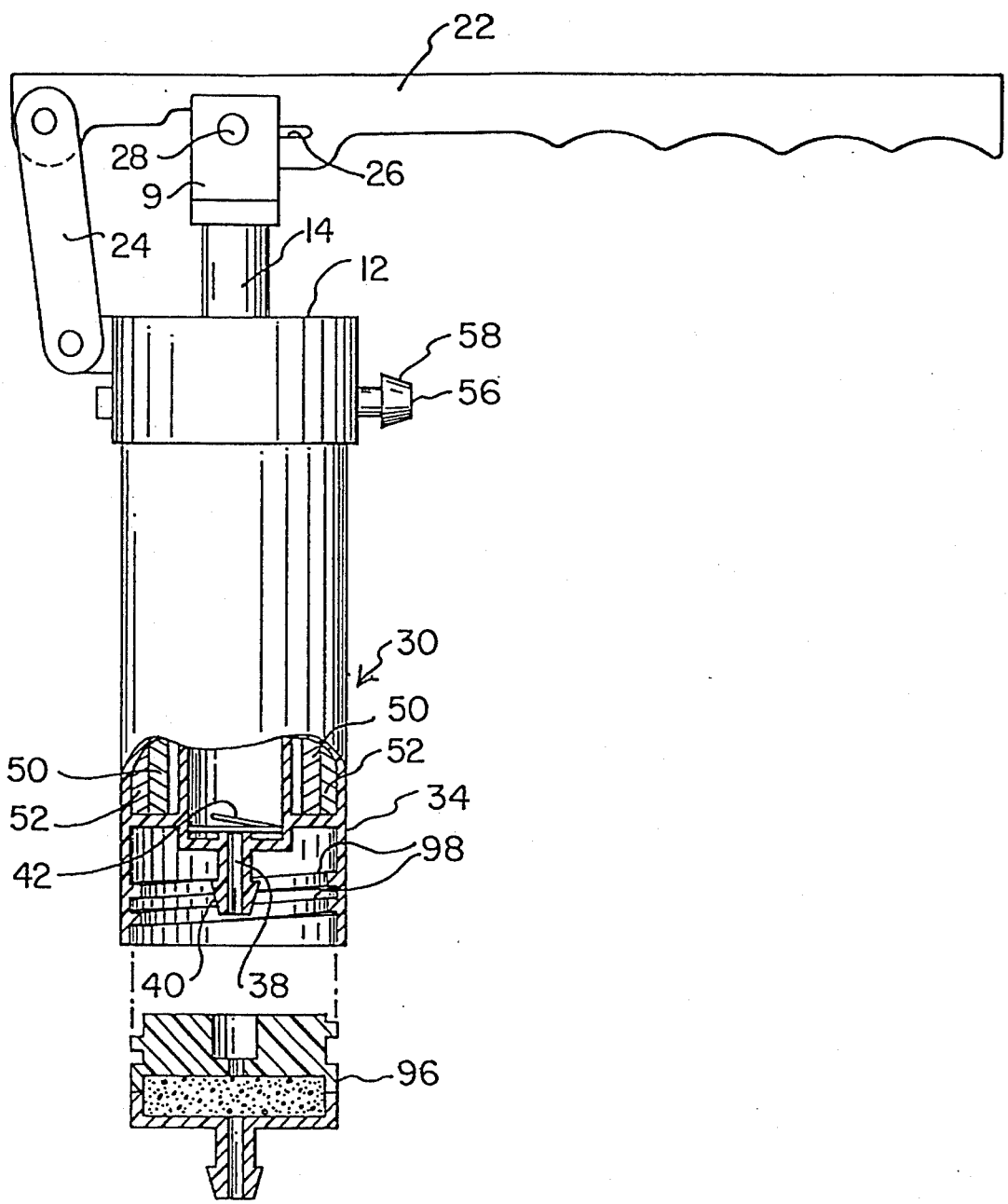
FIG. 7 is a view of a pump of the preferred embodiment with a pre-conditioning unit attached.

Filter cartridge 30 is adapted to be fitted with additional pre-conditioning or post-conditioning units for further purification of water. For instance, as illustrated in FIG. 7, pre-conditioning unit 96 is attached to the lower end of filter cartridge 30 by a screw-on attachment 98. Pre-conditioning unit 96 contains an iodine-coated resin bed to kill viruses, bacteria, and the like which are too small to be filtered out. Fluidized granular activated carbon bed 52 then absorbs any iodine ions in the water.

The present invention provides a lightweight, compact, inexpensive filtration unit that is easily used. The claimed invention is not meant to be limited by this description. Other embodiments and variations are considered to be within the inventive scope of the claimed invention.

We claim:

1. A pump for fluid filtration, said pump comprising:

a housing;

a piston rod slidably mounted on said housing for movement along a first axis of said housing;

a piston affixed to a lower end of said piston rod;

elongated lever means having one end pivotably attached to an upper portion of said housing and attachable at an intermediate location of said lever means to a cross head on an upper end of said piston rod for slidably moving said piston along said first axis of said housing when said lever means is pivoted;

a pump cylinder having an upper end mounted to said housing for enabling said piston to slide within a circular inner bore of said cylinder;

a lower end of said cylinder having inlet means for enabling fluid to enter said inner bore of said cylinder when said piston moves away from said inlet means;

a replaceable filter cartridge;

connector means for removably engaging said replaceable filter cartridge with said housing, said replaceable filter cartridge including:

cylindrical filtering means concentric with and surrounding said pump cylinder;

an inner plenum formed between an upper end portion of said pump cylinder and said filtering means for enabling a substantially uniform, laminar flow of unfiltered fluid to be pumped from said inner bore and through said inner plenum and through said filtering means when said piston moves within said inner bore; and baffle means abutting said cylindrical filtering means and adjacent said inner plenum at an upper end of said inner bore for directing said substantially uniform flow of fluid pumped from said inlet means and through said inner bore into said inner plenum and through said filtering means; and outlet means disposed at an upper end of said cartridge for enabling said fluid to exit said filter cartridge after said fluid is pumped through said filtering means at said substantially uniform flow.

2. The pump of claim 1 wherein said pump further comprises:

means on said piston for providing a double-acting piston to provide uniform fluid flow through said pump when said piston slides within said inner bore; and said inner bore has an inner volume equal to twice the volume of said piston rod of said pump so that the volume of fluid displaced when said piston moves away from said inlet means in said inner bore is substantially equal to the volume of fluid displaced when said piston moves toward said inlet means in said inner bore to provide uniform flow through said pump.

3. The pump of claim 1 wherein said lever means is movable from a compact storage position in which it is folded about said one end of said lever means against said housing and disengaged from said piston rod to a pumping position in which said intermediate location of said lever means engages said piston rod to move said piston within said inner bore at a mechanical advantage when said lever means is pivoted.

4. The pump of claim 1 wherein said pump further comprises:

an adaptor means connected to said outlet means for closely fitting the openings of water containers.

5. The pump of claim 1 wherein the width of said inner plenum is proportional to the flow rate of the fluid through said inner plenum end to the effective length of said inner plenum and to the total wetted perimeter of said inner plenum.

6. The pump of claim 1 wherein said pump further comprises adapter means connectable to said outlet means for interfering engagement with an opening of a container;

wherein said adapter means includes:

a cylindrical member having a connector connectable via a nose with said outlet means;

a vent hole adjacent to said connector to allow air to leave said vent hole as it is filled with fluid from said pump;

a plurality of concentric ring-shaped members of differing diameters formed on a surface of said cylindrical member wherein each of said plurality of concentric ring-shaped members has a diameter to interferingly engage a different size opening of a container.

7. The pump of claim 1 wherein said pump further comprises:

a spring loaded pressure relief valve positioned within said inner bore and within said piston rod, said pressure relief valve defining means for enabling fluid to flow past said pressure relief valve, upwards through the interior of said piston rod and out of said pump when the fluid pressure within said inner bore exceeds a predetermined magnitude.

8. The pump of claim 1 wherein said inner plenum is formed between said inner bore and said filtering means for providing minimum pressure drop through said pump; and wherein said outlet means includes an outer plenum formed adjacent an exit area of said filtering means for providing a low pressured drop through said pump and a substantially uniform flow of fluid out of said pump.

9. The filter cartridge of claim 8 wherein the dimensions of said inner plenum are chosen for uniform flow through said plenum according to the following ratio:

$$R_N = \frac{2QL_p}{NP_{eff}D_f}$$

wherein:

$R_N$=a dimension-less number ranging between 500 and 1500;

N=kinnematic viscosity of the fluid;

Q=volumetric flow rate through said inner plenum;

$L_p$=effective length of said inner plenum;

$P_{eff}$=effective wetted perimeter of said inner plenum;

$P_{eff}=\pi(D_p+D_f)$; and $D_f$=inner diameter of said filtering means adjacent said inner plenum; and $D_p$=inner plenum diameter.

10. The pump of claim 1 wherein said baffle means is formed at an entrance of said inner plenum for preventing high velocity fluid jet flow into said inner plenum and for providing laminar flow into said inner plenum.

11. The pump of claim 10 wherein said baffle means include a non-erodible surface formed in said baffle means to direct the fluid flow from said piston parallel to said filtering means.

12. The pump of claim 1 wherein said filtering means include:

a rigid, cylindrical, tubular mechanical filter means concentric with and surrounding said inner plenum for removing particulate contamination; and a cylindrical granular activated carbon filter means concentric with and surrounding said mechanical filter means for absorbing chlorine and chlorine compounds.

13. The pump of claim 12 wherein said mechanical filter means filters particulate not less than 0.1 micron.

14. The pump of claim 1 wherein said pump further includes:

sealing means on the outer periphery of said piston for providing a double-acting piston;

said sealing means including means for enabling only the one way flow of fluid past said piston and said sealing means as said piston is moved to pump said fluid.

15. The pump of claim 14 wherein sealing means on said piston defines means for preventing fluid flow past said sealing means during the movement of said piston away from said inlet means and enables fluid to flow past said sealing means during the movement of said piston toward said inlet means; and said inlet means includes inlet valve means for enabling fluid to enter said inner bore during the movement of said piston away from said inlet means and preventing fluid from exiting said inlet means during the movement of said piston towards said inlet means.

16. The pump of claim 14 wherein said sealing means include a seal having a flexible outer lip, said flexible outer lip defining means for preventing toward an inner surface of said inner bore during the movement of said piston away from said inlet means to prevent fluid flow past said piston during the movement of said piston away from said inlet means, and for moving away from said surface of said inner bore during the movement of said piston towards said Inlet means to allow fluid flow past said piston during the movement of said piston towards said inlet means.

* * * * *